UNITED STATES PATENT OFFICE.

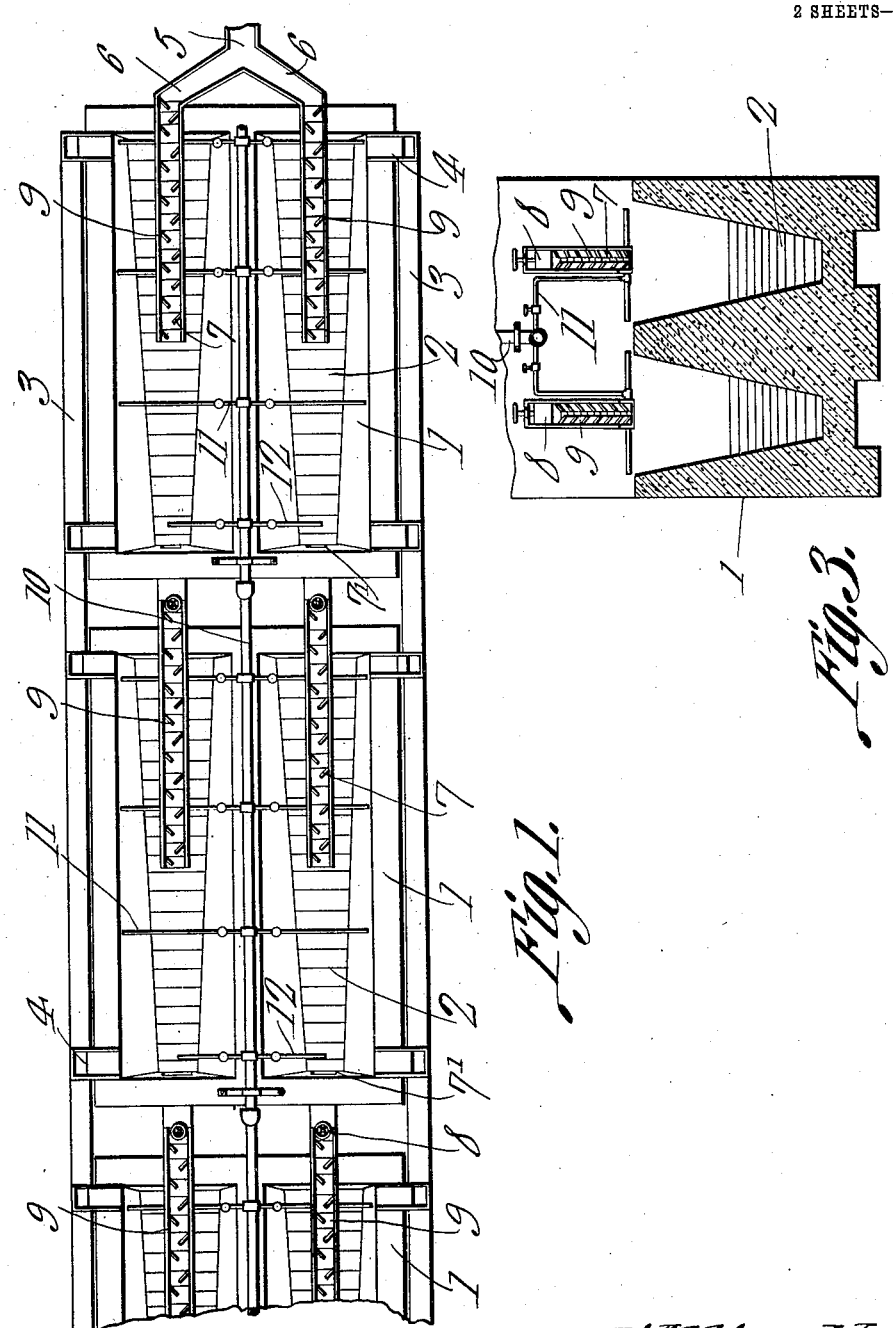

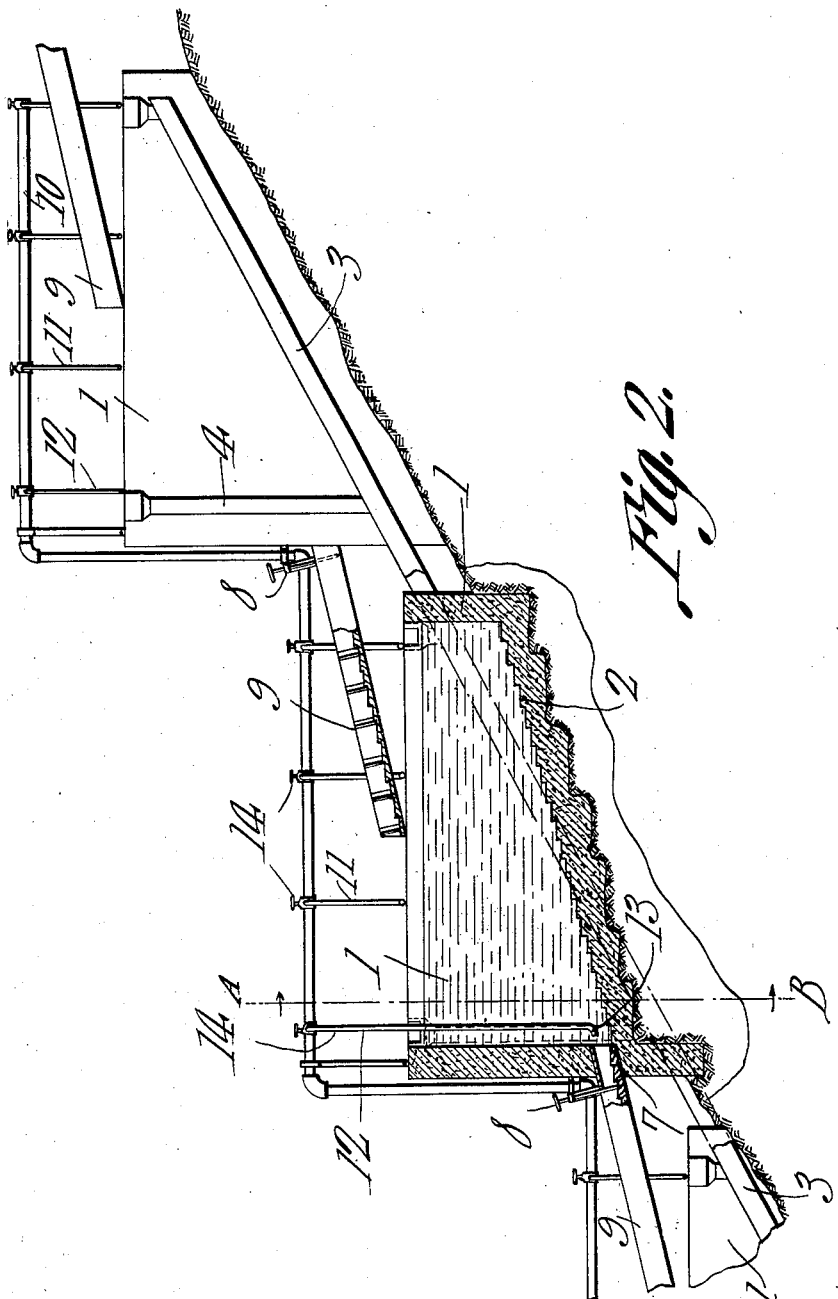

WILLIAM YEO, OF DUNBAR, PENNSYLVANIA.

SAND-WASHING APPARATUS.

1,020,868.  Specification of Letters Patent.  Patented Mar. 19, 1912.

Application filed January 5, 1911. Serial No. 600,910.

*To all whom it may concern:*

Be it known that I, WILLIAM YEO, a citizen of the United States, residing at Dunbar, in the county of Fayette and State of Pennsylvania, have invented a new and useful Sand-Washing Apparatus, of which the following is a specification.

This invention relates to apparatus for use in washing sand, its object being to provide tanks arranged in series and in stepped relation so that sand and water may be supplied by gravity to the various tanks, the contents of each tank draining into the next adjoining tank and there being means whereby the sand and water will be thoroughly agitated while passing from one tank to the other and thus separate from the sand any undesirable material which may be mixed therewith.

A further object is to provide washing apparatus which effects a saving in the sand, requires no power driven mechanism, and which can be operated under practically any climatic conditions.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings, the preferred form of the invention has been shown.

In said drawing:—Figure 1 is a plan view of two sections and part of a third section of apparatus embodying the present improvements. Fig. 2 is a view partly in side elevation and partly in section of the parts shown in Fig. 1. Fig. 3 is a section on line A—B Fig. 2.

It is to be understood that the apparatus constituting the present invention should, preferably, be located on the side of a hill or wherever there is a natural inclination although, if desired, a suitable structure may be erected for supporting the various tanks at different elevations. It is also desirable to so locate the apparatus that water may be supplied to the upper portion thereof without the necessity of utilizing hoisting apparatus. In the drawings the apparatus has been shown upon an inclined surface and said apparatus is made up of a series of tanks 1 each of which may be formed of concrete, as shown, or of metal, wood or any other suitable material. The various tanks are arranged in stepped relation and the floor of each tank is preferably stepped, as indicated at 2. Waste troughs 3 are extended along the sides of the tanks and each tank has an overflow trough 4 opening into the waste trough, one of these overflow troughs being preferably extended from each end portion of the tank. Each tank is preferably made up of two compartments, as clearly indicated in Figs. 1 and 3, the walls of each compartment converging downwardly and also converging toward the lower or discharge end of the tank. The compartments of the uppermost tank 1 are supplied from a main trough 5 through branch troughs 6, these troughs being all provided with diagonally disposed riffles 7 disposed in staggered relation whereby sand and water traveling within the trough will be thoroughly agitated. Each compartment of each tank 1 has an outlet opening 7 at its lower end and which is adapted to be closed by a gate valve 8 of any desired construction. Each of these outlets opens into a riffle trough 9 extending over and discharging into one of the compartments in the next adjoining tank.

A water distributing pipe 10 extends over the various tanks and has discharge pipes 11 branching therefrom and discharging downwardly into the compartments in the tanks, there being an additional pipe 12 extending from the distributing pipe 10 and downwardly close to the outlet of each compartment in each tank, said pipe 12 terminating in nozzles 13 designed to direct water into the outlet 7 and thus keep it clear and insure the passage of sand from the tank.

Sand washing, in its general sense, requires both friction between the grains and positive agitation, the friction serving to dislodge loam or other foreign substances from the sand grains while the agitation by means of water permits the separated foreign substances to rise from the sand and be carried therefrom. With the foregoing facts in mind the tank heretofore described has been devised. In washing the sand it will be found that the sand is much heavier than the loam or other foreign substances commingled therewith and these other substances will, therefore, rise to the surface of the water in which the sand is contained. Thus it will be seen that, in delivering sand through, for example, the riffle troughs 6 to the tank 1, the sand is thoroughly agitated by the water and is caused to rub together so as to produce the friction necessary in addition to the agitation of the water, to remove the foreign substances from the sand grains. When the material, after thus having been agitated and rubbed within the riffle troughs is delivered to the tank 1, the sand, being heavier than the loam and other foreign substances, will sink to the bottom of the tank while the loam and other foreign substances will rise to the top of the water contained within the tank. The tank is kept closed while being filled in this manner and after it has been filled and the objectionable foreign substances have been carried off by the overflow through the trough 4 to the waste trough 3, the supply of material to the tank from the riffle troughs 6 is cut off. The gate 8 is then opened and water is directed into the nozzle 13 at the narrow outlet end of the tank and the water discharging from this nozzle will operate to wash the sand from the lower steps of the bottom of the tank and into the riffle trough 9 where the agitation and frictional contact of the grains of sand will be repeated prior to the discharge of the sand and any adhering foreign substances into the next adjoining tank. After the sand at the discharge end of the tank has been discharged by means of water escaping from the nozzle 13, water is directed into the next adjoining pipes 11 and, in leaving these pipes, washes the sand downwardly along the stepped bottom of the tank and to the outlet. After all of the sand in the path of the water thus discharged has been washed to the outlet, water is directed into the next adjoining pipes 11 whereupon additional sand is washed over the stepped bottom and into the outlet trough 9. Finally water is directed into the last set of pipes 11, thus completely clearing out the tank and causing all of the sand to be washed into the trough 9. Thus it will be seen that the sand, while being washed from the tank, will be further agitated and rubbed while passing over the stepped bottom of the tank, the agitation thus produced on the bottom being similar to that obtained in the riffle troughs. Obviously the stepped bottom does not exercise any function differing from that of an ordinary flat bottom, unless the sand is flowing along said bottom to the outlet of the tank in the manner hereinbefore set forth.

By tapering the walls of the tank in the manner shown and described the width of the stepped bottom is reduced to the minimum and the sand, in passing over said bottom, can be agitated and rubbed by using the minimum amount of water. Furthermore, as the bottom of the tank is wider at the top than at the bottom, it will be apparent that, as the sand moves downwardly toward the outlet, the grains will crowd together and the friction therebetween will therefore be increased.

Obviously, as a result of the frictional contact of the grains and the agitation hereinbefore described, the sand, after passing through a series of tanks such as have been described, will be discharged finally in a thoroughly clean condition. Then too, any number of these tanks may be arranged in a series, the number being to a great extent dependent upon the quality of the sand to be washed. The various pipes can of course be provided with valves such as indicated at 14, whereby the discharge of water into the tanks for the purpose of washing the sand toward the outlet, may be fully controlled.

What is claimed is:—

1. Sand washing apparatus including a tank having its bottom stepped downwardly from one end to the other, there being a valved outlet at the lower end of the bottom, means for feeding the sand and water to the tank, and separate means at different distances from the outlet for washing the sand over the stepped bottom to the outlet.

2. Sand washing apparatus including a tank having its bottom stepped downwardly from one end to the other, there being a valved outlet at the lower end of the bottom, the side walls of the tank converging toward the outlet end of the tank, means for feeding sand and water into the tank, and separate means at different distances from the outlet for washing the sand over the stepped bottom and into the narrow portion of the tank to the outlet.

In testimony that I claim the foregoing as my own, I have hereto affixed my signature in the presence of two witnesses.

WILLIAM YEO.

Witnesses:
AUSTIN A. FRAZEE,
M. D. WILLIAMS.

---

Copies of this patent may be obtained for five cents each, by addressing the "Commissioner of Patents, Washington, D. C."